United States Patent
Chen et al.

(10) Patent No.: US 12,045,597 B2
(45) Date of Patent: Jul. 23, 2024

(54) METHOD AND MECHANISM FOR OPERATING SYSTEM IMAGE INSTALLATION BASED ON DECOUPLED ARCHITECTURE

(71) Applicant: Quanta Cloud Technology Inc., Taipei (TW)

(72) Inventors: Yi-Xian Chen, Taipei (TW); Jia-Yu Juang, Taipei (TW); Tong-Pai Huang, Taipei (TW); Chia-Jui Lee, Taipei (TW)

(73) Assignee: QUANTA CLOUD TECHNOLOGY INC., Taipei (TW)

( * ) Notice: Subject to any disclaimer, the term of this patent is extended or adjusted under 35 U.S.C. 154(b) by 76 days.

(21) Appl. No.: 17/745,527

(22) Filed: May 16, 2022

(65) Prior Publication Data
US 2023/0367574 A1  Nov. 16, 2023

(51) Int. Cl.
*G06F 8/61* (2018.01)
*G06F 8/70* (2018.01)
*G06F 9/445* (2018.01)

(52) U.S. Cl.
CPC .............. *G06F 8/63* (2013.01); *G06F 8/70* (2013.01); *G06F 9/44505* (2013.01); *G06F 9/44536* (2013.01)

(58) Field of Classification Search
None
See application file for complete search history.

(56) References Cited

U.S. PATENT DOCUMENTS

| 7,356,679 | B1* | 4/2008 | Le | G06F 16/116 |
| | | | | 713/1 |
| 11,093,221 | B1* | 8/2021 | Novy | G06F 8/63 |
| 2014/0172783 | A1* | 6/2014 | Suzuki | G06F 8/63 |
| | | | | 707/754 |
| 2019/0171431 | A1* | 6/2019 | Wei | G06F 8/63 |
| 2019/0250960 | A1* | 8/2019 | Zhang | G06F 9/5077 |
| 2020/0241867 | A1* | 7/2020 | Gainsborough | G06F 8/63 |
| 2021/0064412 | A1* | 3/2021 | Yamaguchi | G06F 9/45558 |
| 2022/0179959 | A1* | 6/2022 | Silveira | G06F 21/53 |

* cited by examiner

*Primary Examiner* — Marina Lee
(74) *Attorney, Agent, or Firm* — NIXON PEABODY LLP

(57) ABSTRACT

A system and method for providing operating system (OS) installation images in a computer system including a deployment server and a target computer device such as a target server. The deployment server executes a bundle builder that receives a configuration file for a system layer, a kernel layer, and an application layer. Files are collected according to the configuration file. Packages for a system layer, a kernel layer, and an application layer are assembled in a combined OS installation image. The combined OS installation image is sent to the target server.

20 Claims, 11 Drawing Sheets

Table 1. Examples of different configuration files, packages, and image files.

| Item | Configuration file | Image file |
|---|---|---|
| 1 | image file type: .iso | myimage.iso |
| 2 | image file type: .qcow2 | your.qcow2 |
| 3 | image file type: .tar | his.tar |
| The image file can be customized to different formats. https://docs.openstack.org/glance/latest/user/formats.html | | |

FIG. 5

METHOD AND MECHANISM FOR OPERATING SYSTEM IMAGE INSTALLATION BASED ON DECOUPLED ARCHITECTURE

TECHNICAL FIELD

The present disclosure relates generally to management for computing devices. More particularly, aspects of this disclosure relate to a system that provides operating system images with a decoupled architecture.

BACKGROUND

Servers are employed in large numbers for high demand applications, such as network based systems or data centers. The emergence of the cloud for computing applications has increased the demand for data centers. Data centers have numerous servers that store data and run applications accessed by remotely connected, computer device users. A typical data center has physical chassis rack structures with attendant power and communication connections. Each rack may hold multiple computing servers and storage servers that are networked together.

The servers in a data center facilitate many services for businesses, including executing applications, providing virtualization services, and facilitating Internet commerce. Servers typically have a baseboard management controller (BMC) that manages internal operations and handles network communications with a central management station in a data center. Different networks may be used for exchanging data between servers and exchanging operational data on the operational status of the server through a management network.

As companies place more dependence on services from data center servers, uptime becomes more critical and valuable. When a server or servers are not available, productivity slows down or stops entirely, costing businesses profitability. Although a data center manager may take every precaution to prevent service from being interrupted from faults in the servers, the problem of server downtime is difficult to fully eliminate. For example, server firmware may be updated to improve the operation of such hardware components without having to replace them, but this requires some down time to update the firmware. One of the primary causes of server downtime is making upgrades to operating system firmware.

For data center administrators, one challenge is updating firmware for multiple servers as this process consumes time resources. Generally, administrators adopt a default image to deploy the operating system, set up the system environment, and install applications on the root file system for server deployment on each server. To deploy a large batch of servers, administrators need to manually implement the aforementioned deployment process for each server. Furthermore, when modifying several applications on massive number of servers, administrators generally manually duplicate those modified applications for each server. In instances when installing a different operating system version, administrators have to set up the system environment and applications again for the different version. These complicated deployment processes can lead to human intervention errors, ineffective deployment processes, and consume time.

Thus, there is a need for a system for accelerating the automated deployment of operating system images to a batch of servers and avoiding the occurrence of human errors in operating system deployment. There is also a need for an operating system with decoupled architecture that enables administrators to customize and duplicate developing environments, boosting the flexibility of feature customization. There is another need for a system that allows building user-specific standardization for batch deployment to multiple servers.

SUMMARY

One disclosed example is a computer system including a target computer device and a network coupled to the target computer device. A deployment server is coupled to the network. The deployment server executes a bundle builder to provide an operating system (OS) installation image to the target computer device. The bundle builder is operable to read a configuration file and collect files for corresponding packages for a system layer, kernel layer, and an application layer. The bundle builder consolidates the packages into an OS installation image file.

A further implementation of the example system is an embodiment where the target computer device is a first target server and the system further includes a second target server coupled to the network. Another implementation is where the deployment server installs the OS installation image on the first and second target servers. Another implementation is where the deployment server is further operable to receive a second configuration file. The deployment server combines packages of a second combined OS installation image based on the second configuration file. The second OS installation image has a different package for at least one of the system layer, the kernel layer, and the application layer from the packages of the first OS installation image. The second OS installation image is sent to the second target server. Another implementation is where the application layer package includes user application files. Another implementation is where the system layer package is built from the root file system and includes environment configurations. Another implementation is where the kernel layer package includes operating system components. Another implementation is where the files are collected from one of local storage, a file server, or a cloud server. Another implementation is where a new configuration file is read that provides at least one new kernel layer package, one new system layer package, or one new application layer package. Another implementation is where the OS installation image is generated in a predetermined format.

Another disclosed example is a method of providing operating system (OS) installation images in a computer system. The server system includes a deployment server and a target computer device. A configuration file for a system layer, a kernel layer, and an application layer is received. Files according to the configuration file are collected. Packages for a system layer, a kernel layer, and an application layer are assembled in a combined OS installation image. The combined OS installation image is sent to the target computer device.

Another implementation of the example method is where the target computer device is a first target server and the system includes a second target server, and the OS installation image is sent to the second target server. Another implementation is where the system includes a second target server. A second combined OS installation image based on a second configuration file, having a different package for at least one of the system layer, the kernel layer, and the application layer, is sent to the second target server. Another implementation is where the application layer package includes user application files. Another implementation is where the system layer package is built from the root file system and includes environment conditions. Another implementation is where the kernel layer package includes operating system components. Another implementation is where the files are collected from one of local storage, a file server, or a cloud server. Another implementation is where a new configuration file is read that provides at least one new kernel layer package, one new system layer package, or one new application layer package. Another implementation is where the new OS installation image is sent to at least one target server and booted to replace the corresponding kernel layer, system layer or application layer. Another implementation is where the OS installation image is generated in a predetermined format.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which:

FIG. 5 is a table showing is an example of an OS installation image file format;

Figure 1A:
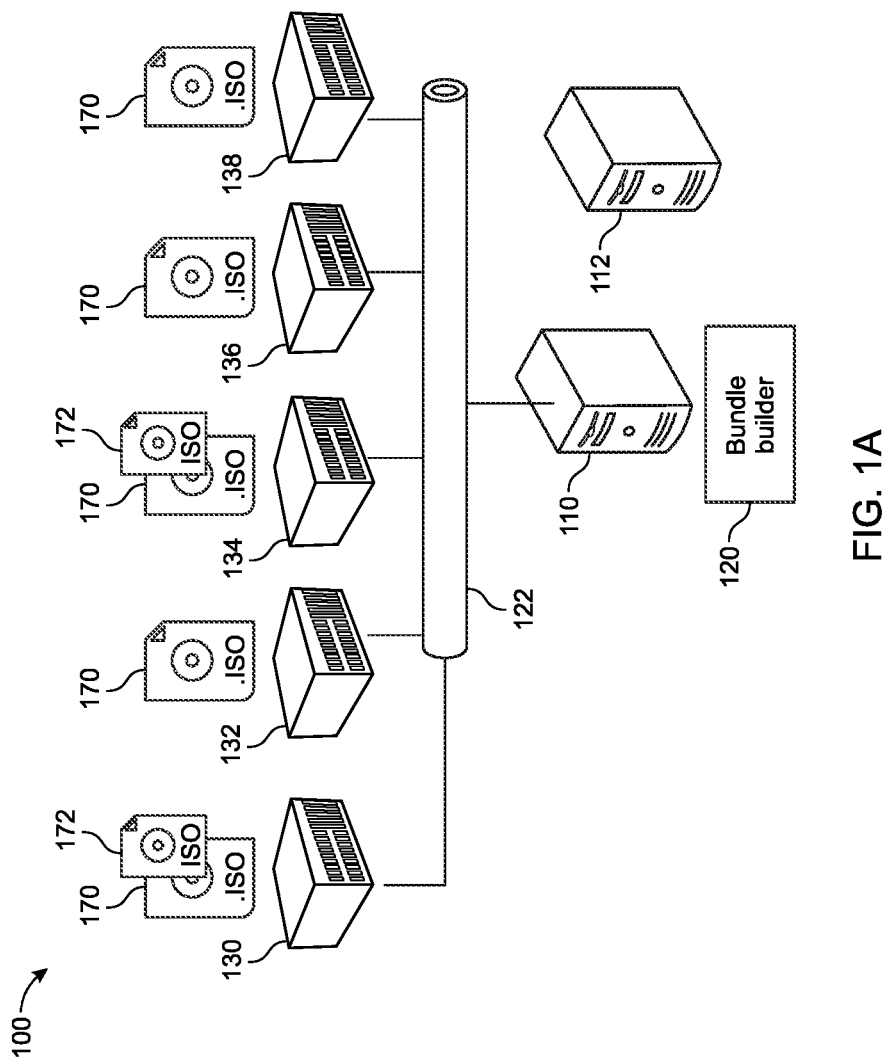
FIG. 1A is a block diagram of a system that allows modular assembly of OS installation images for an operating system installed on target servers.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure is directed toward a system and method to simplify and streamline the deployment process of operating system (OS) installation images for a batch of networked computer devices, such as servers in a data center. An example OS installation image bundle builder generates a customized OS installation image file by using a configuration file that may be edited by a data center administrator. With this customized OS installation image, data center administrators can simultaneously install an operating system (OS), set up the system environment, and deploy applications to batches of servers. Meanwhile, the deployment for a batch of servers with identical environments may be implemented simply by copying the customized OS installation image. Aside from the deployment for a batch of servers, the example framework has an OS architecture that decouples the OS into three layers, a kernel layer, a system layer, and an application layer. The example framework allows for modifying specified features in each of the layers. The three layer OS architecture allows administrators to simultaneously modify specified features on each layer at one time for multiple servers rather than modifying specified features for each individual server. The specified features of the example OS installation image may include OS component versions, system environment components, and applications.

FIG. 1 shows a computer system 100 that includes multiple networked computer devices such as servers. The computer system 100 includes a management server 110 (or management station) that accesses a file server 112 that may store files for different operating system configurations, system environments and applications. Other storage sources for files may be used instead of the storage server 112 such as a bootable USB, traditional medias such as CD and DVD, or another networked device. The management server 110 and file server 112 are coupled to a network 122. The management server 110 performs operating system (OS) installation by executing an example bundle builder 120 for assembling OS installation images that may be deployed on servers coupled to the network 122. In this example, such servers are example target servers 130, 132, 134, 136, and 138 that are coupled to the network 122. Although there are five servers in this example, the principles herein allow management of OS installation images to much larger numbers of servers or other computing devices. As will be explained, the target servers 130, 132, 134, 136, and 138 are servers in the system 100 that are initialized and provisioned by the management server 110.

In this example, the servers 130, 132, 134, 136, and 138 each have a baseboard management controller (BMC). The BMC in each of the servers includes a network interface card or a network interface controller that is coupled to the network 122 to the external administrative station, such as the management server 110. In this example, the network 122 is based on DHCP services provided over a LAN. The BMC may perform hardware diagnostics of hardware components of the server. The BMC also monitors the health of hardware components of the server. The servers 130, 132, 134, 136, and 138 all include hardware components that may perform functions, such as storage, computing and switching. For example, the hardware components may be processors, memory devices, network interface cards, storage controllers, PCIe devices/cards, and the like. Such hardware components must be supported by different software/firmware components for proper server operation.

In this example, the management server 110 is used to install operating systems and deploy server software/firmware, such as a live OS, OS installation files, and update tools to the target servers 130, 132, 134, 136, and 138, which can automatically install the operating system. The live OS is a production computer operating system on which all testing has been completed so that it is fully operational and ready for production work.

Figure 1B:
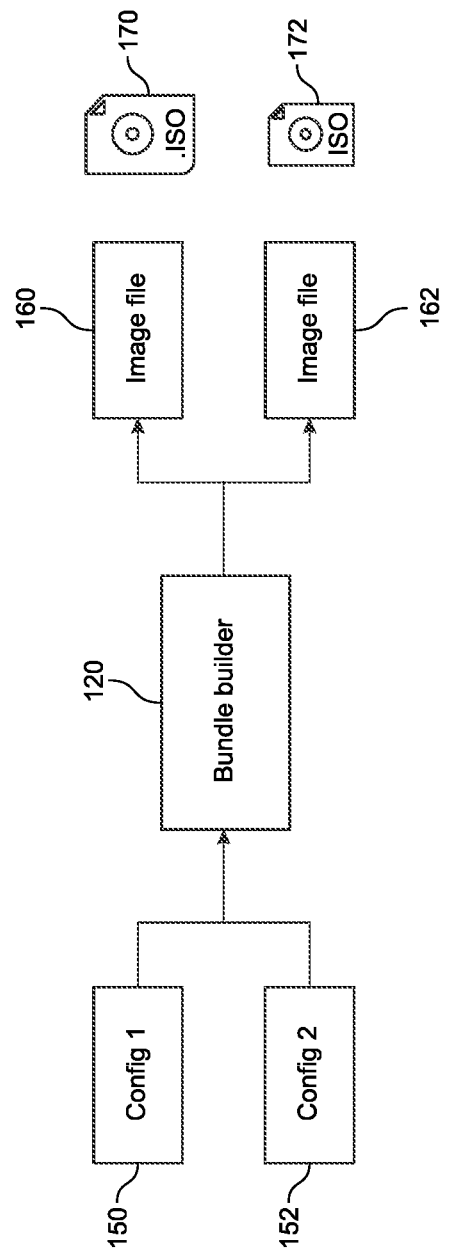
FIG. 1B is a diagram showing different OS installation images for the target servers in the data center in FIG. 1A.

FIG. 1B shows the distribution of different image files for the purpose of deploying the operating system, setting up the system environment, and installing applications on the target servers 130, 132, 134, 136, and 138 in FIG. 1A. In this example, the bundle builder 120 is a service running on a computing device, such as the management server 110 to generate customized image files for the target servers 130, 132, 134, 136, and 138. These image files can be mounted to another server or servers required to automatically initiate operating system (OS) installation by booting the OS installation image. Through the bundle builder 120, administrators can create different image files based on different configuration files for different servers or groups of servers that may have common requirements for software/firmware.

The bundle builder 120 accepts different configurations for different image files in the form of configuration files created or edited by an administrator. For example, a first configuration file 150 results in generation of a first OS installation image file 160. A second, different, configuration file 152 results in generation of a second OS installation image file 162. In this example an administrator installs an OS 170 on a baremetal server, such as the servers 130, 132, 134, 136, and 138 by adopting the first OS installation image file 160. Then, administrators can modify features on any layer for any of the servers 130, 132, 134, 136, and 138 by adopting the second OS installation image file 162. For example, the servers 130 and 134 also adopt the second OS installation image file 162 for generating another different OS 172 for those servers 130 and 134.

Thus, as shown in FIG. 1A, an administrator may install the OS 170 with the first OS installation image file 160 on five baremetal servers 130, 132, 134, 136, and 138. Any of the three layers of the OS 170 may be changed. For example, when there is a need to change the kernel version on the servers 130 and 134, an administrator overwrites features by providing the second OS installation image file 162 on the kernel Layer for these two servers 130 and 134. However, the other components of the OS installation image file 160 such as the application layer and the system layer remain the same for the second OS installation image file 162. There are several approaches that administrators can adopt to automatically trigger the OS installation process. For example, administrators can adopt modified OS installation image files to create a bootable USB device that may be plugged into the servers 130 and 134. The servers may be booted from the USB device with the OS stored on the USB device. Administrators can also mount OS installation image files on the servers 130 and 134 via the network 122, and boot the modified OS installation image files via the BMC on the servers.

Figure 2:
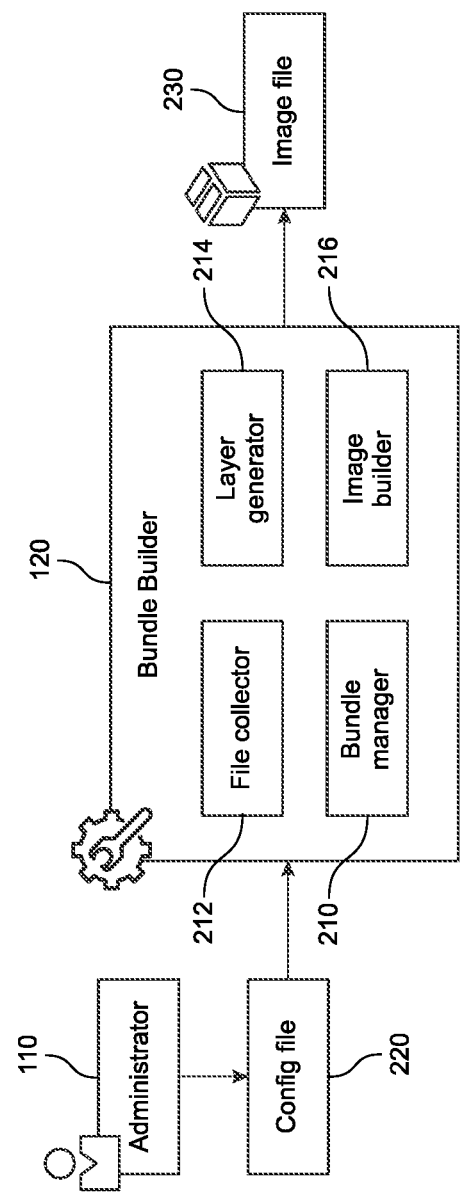
FIG. 2 is a block diagram of an example image generated from an example bundle builder.

FIG. 2 shows the modules of the bundle builder 120 in FIG. 1A. The bundle builder 120 includes a bundle manager module 210, a file collector module 212, a layer generator module 214 and an image builder module 216. The bundle manager module 210 manages the flow of the functions of the bundle builder 120 by parsing a configuration file 220 and triggering the other modules 212, 214 and 216 to run individual tasks. When an exception occurs, the bundle manager module 210 either implements actions to address the issues or report the error to an administrator via the management server 110. For example, when the value of OS component is null in configuration file indicating a failure to collect the file, the bundle builder manager 210 can automatically download a default OS component. Alternatively, when the application path does not exist in the configuration file for the component, the bundle builder manager 210 can return an "error message" and request the administrators to check the configuration file.

In the example framework, an administrator may edit configuration files for creating different OS installation images, such as an OS installation image 230. The example configuration files include the version of OS components (e.g., vmlinuz, initramfs.img, firmware.tar.xz, and module-.tar.xz), the system environment (e.g., root file system setting and environment configuration), and the applications (e.g., user file, and packages). In the bundle builder 120, the bundle manager 210 first parses the content of the configuration file for instructing the file collector module 212 to collect user data and OS components based on the content. Then the layer generator module 214 distributes the collected data and components to the different layers. The image builder module 216 then generates a customized OS installation image file for OS installation by combining packages from the three layers.

Figure 3:
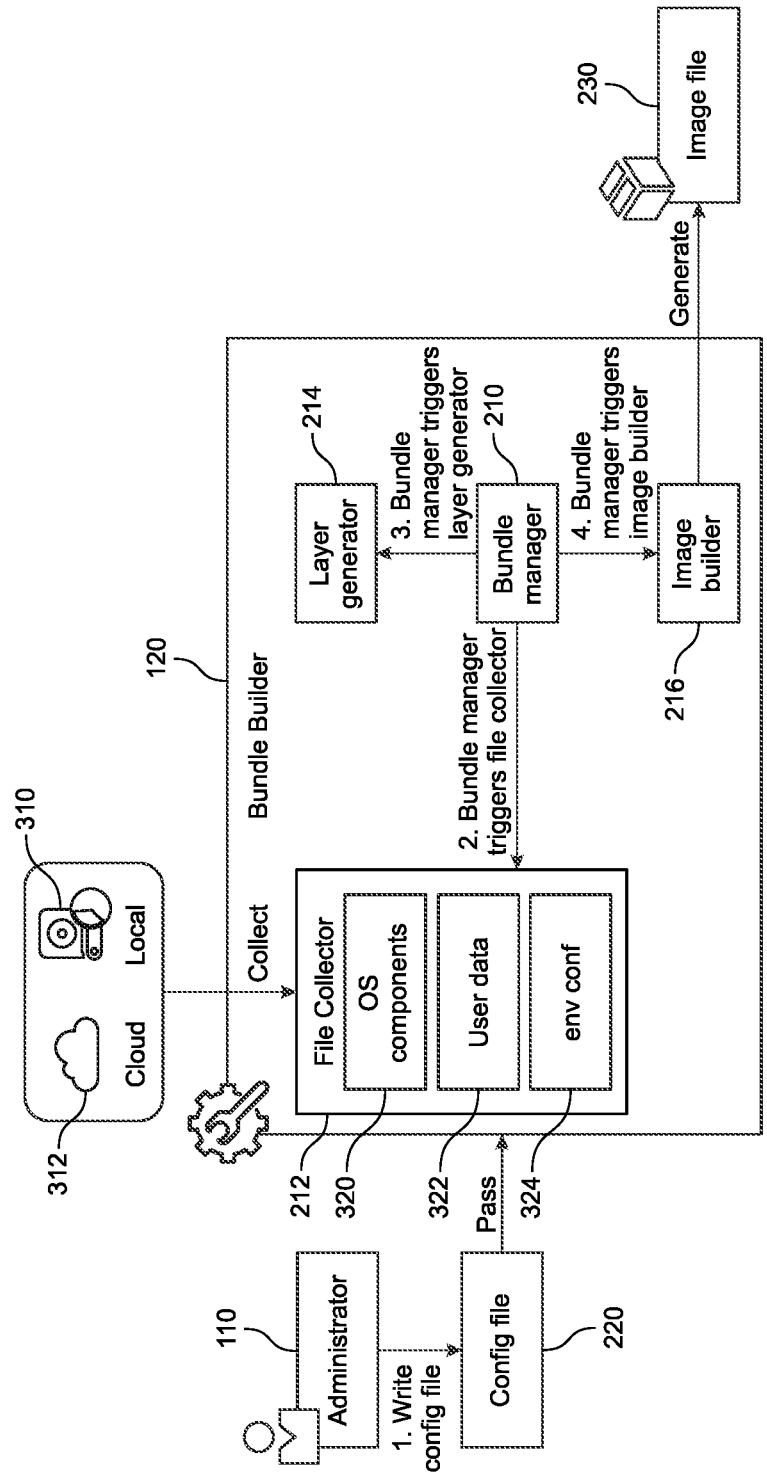
FIG. 3 is a process diagram showing the sources of files to assemble a OS installation image file with the bundle builder in FIG. 2.

FIG. 3 shows the process of generating the OS installation image file 230 by the bundle builder 120. The bundle builder 120 operates according to the following sequence. An administrator or other user first creates or edits the configuration file 220 for the desired operating system. Administrators can adopt any text editor, such as Vim, as an interface to modify the configuration file. The completed configuration file 220 is sent to the bundle builder 120.

The configuration file 220 is input to the bundle manager 210. The bundle manager 210 is viewed as an entry point that parses the configuration file 220 and triggers a series of processes to assemble the desired OS installation image file. The file collector 212 first collects and generates files, including OS components, user data, and environment configurations according to the configuration file 220. The OS components are the basic components of the operating system to boot the OS such as a Linux kernel binary, an initial ramdisk binary, kernel modules and firmware. The user data is a user file that includes applications, packages, and other files referenced by the configuration file. The files are collected by tracing the file path provided by the configuration file. The environment configuration refers to configuration of system environment settings. The environment settings are different variables in configurations such as user privilege, network, and IP protocol, which are in the "/etc" system configuration folder of the operating system. For example, for network environment configuration, users can adopt /etc/sysconfig/network-scripts/ifcfg-eth0 to modify network settings such as IP address or gateway. The file collector 212 writes the environment configurations based on the configuration file 220. The environmental configurations are used to modify environment settings on the system layer.

The file collector module 212 collects files required by a configuration file from different sources 310 and 312. The files are thus obtained from sources such as a local device 310, a server such as the file server 112 in FIG. 1, or a cloud storage 312. The files include OS component files 320, user data files 322, and environment configuration files 324. The file collector module 212 sends the collected files to the layer generator module 214.

The bundle manager 210 activates the layer generator module 214 to assemble OS components and combine the OS components with user data for the different layers. The administrator generates an OS installation image through the bundle builder 210 by editing the configuration file 220 in accordance with their requirements. The generated OS installation image can substitute a specific layer or layers. In such a case, the file collector module 212 would collect different files in accordance with the edited configuration file.

In this example, the three layers of the operating system are a kernel layer, a system layer, and an application layer. When replacing an OS component with an updated version, administrators can substitute the kernel layer for a new one while leaving the system layer and the application layer as they are. For example, when firmware such as an ice driver for an Intel network interface controller (NIC) card is updated, an edited configuration file is provided for a new kernel layer package while the packages for the system layer and the application layer remain the same.

The system layer is a read-only image, which is built from the root file system, enhancing the stability of the system layer. The system layer in this example is compressed with SquashFS format to minimize resource utilization. Commonly used services, such as packages and applications, can be installed in this layer. When changing built-in services or environment settings, administrators can substitute the system layer for a new system layer, while leaving the kernel layer and the application layers in place. For example, when environment setting such as the OS environment configuration is the/etc configuration file is updated, an edited configuration file is provided for a new system layer package while the packages for the kernel layer and the application layer remain the same. For example, an edited password configuration may be provided for a new system layer by adopting/etc/passwd to modify a user password for confirmation of RPM package installation and OS login.

In this example, the application layer is operated by administrators as a developing environment. The application layer only holds specific data and applications, which makes applications easily distributed and deployed to the servers. When encountering errors or changing their requirements, administrators can substitute the application layer for a new application layer, while leaving the system layer and the kernel layers in place. For example, when a new application is required, the configuration file allows the collection of the new application file for a new application package.

The image builder module 216 is used to generate one of several different format types for an image file, which is used to create a bootable image such as the image file 230. The format types in this example include .tar, .iso, .qcow2, and .vhd type formats. Administrators can select different formats for the configuration file in accordance with different platforms. For example, the .iso format can be used to mount on servers; while the .qcow2 and .vhd formats are used on virtual machines (VMs).

The image builder module 216 combines packages, such as kernel.tar.xz, squashfs.img, and application.tar.xz type packages from the three layers (kernel, system, and application) with the base image file into an overall OS installation image file. The generated OS installation image file can be used to install an OS and deploy a system environment by unpacking each package when the generated OS installation image file is deployed on a target server or servers.

Figure 4:
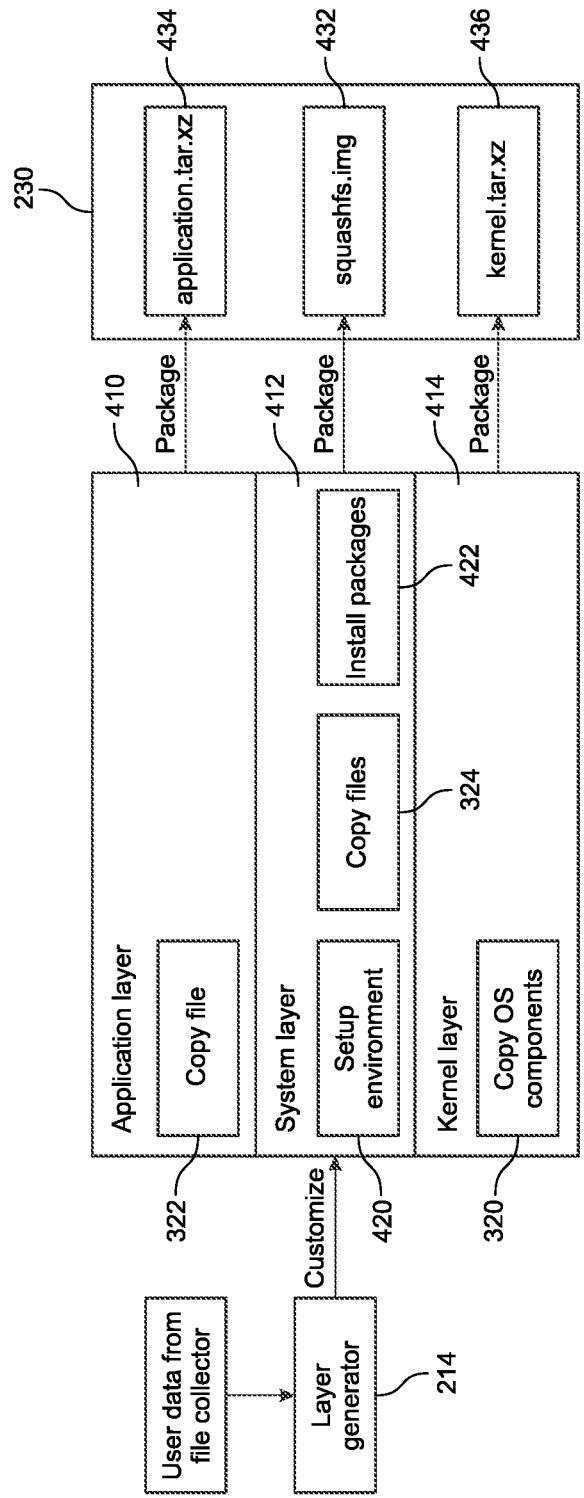
FIG. 4 is a block diagram of the example layer generator of the bundle builder in FIG. 2.

FIG. 4 shows the process flow of the bundle builder 120 in relation to the operation of the layer generator module 214. The layer generator 214 creates files for an application layer 410, a system layer 412, and a kernel layer 414. In relation to the system layer 412, the layer generator 214 sets up the environment (420). The file collector module 212 downloads or collects files from local or cloud storage while the layer generator 214 packages the files of each layer and generate layer packages. The file collector module 212 downloads the environment configuration files. After booting the OS, the OS can automatically apply the settings.

The layer generator 214 copies the environment configuration files 324 from the file collector 212 to the root file system. The layer generator 214 installs different software packages in the system layer 412 (422). The layer generator 214 compresses this file system into the squahsfs.img format in this example and produces a system layer package 432 including environment configurations, commonly used applications and software packages. Meanwhile, the layer generator 214 packages the user data files 322 in the application layer 410 and generates an application.tar.xz application package 434. The layer generator packages the collected OS component files 320 in the kernel layer 414, and generates a kernel.tar.xz kernel package 436 that includes OS components.

The image builder module 216 finally combines the packages 432, 434, and 436 obtained from the three layers 410, 412, and 414. The combination of the file packages 432, 434, and 436 results in generating the customized OS installation image file 230. In this example, the image builder module 216 combines the packages to generate the customized image file 230 using the Linux mkisofs command.

By adopting this framework, administrators can utilize the generated image file to customize the developing environment and deploy the resulting image file to a huge batch of servers, such as the servers 130, 132, 134, 136, and 138 in FIG. 1. The above described process obviates the need to format a disk for the operating system. In conventional systems, installation of the OS requires partitioning and formatting a disk that may result in data loss. However, the substitution of three layers implemented on the disk has no need to partition and format the disk. Thus, administrators can flexibly update specified features on each layer based on their requirements. Thus, an administrator may send updated images with different types of layers to specific servers.

Administrators can generate a customized image file after sending an edited configuration file to the bundle builder 120. The image file may be customized in the layer generator 214 through files obtained from the file collector 212 in accordance with the edited configuration file, which are allocated to different layers and packages. The different layers and packages can be subsequently generated and used to replace different layers in the original image based on the Linux standardized packing procedure in this example.

FIG. 5 is a is an example of OS installation image file formats. In this example, a configuration file may be written in one of three formats by the image builder module 216. The image builder module 216 generates different formats for the OS installation image based on the contents of the configuration file. These formats include the .iso (for optical discs) format, the .tar (for the Unix-based utility tar for packaging files together for backup or distribution purposes), and a virtual machine format, such as the QEMU copy on write (QCOW) .qcow2 format. As for the layer generator 214, the package for the application layer 410 and the kernel layer 414 may be a zipped Unix based file format, such as .tar.xz. The package for the system layer 412 may be a compressed read-only file system disk image, squashfs.img. The corresponding OS installation image file may thus be in either the .iso format, .tar format or the .qcow2 format. The image formats for the OS installation image file may be adopted to not only servers, but other computer devices such as laptops, virtual machines, containers and the like.

Figure 6:
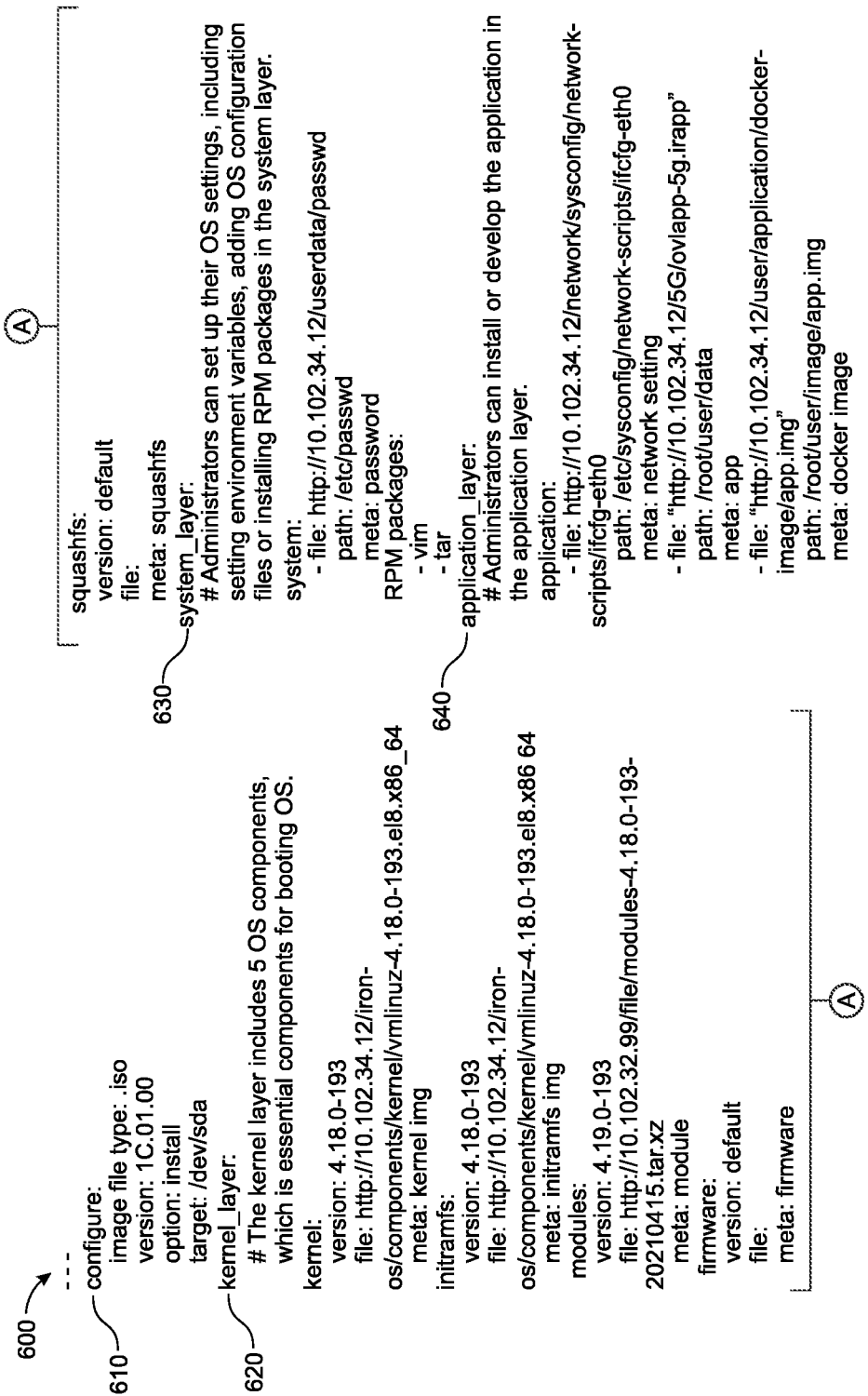
FIG. 6 is an example configuration code segment for determining the sources to assembly an image file.

FIG. 6 shows an example configuration file 600 that is sent to the bundle builder 120. The configuration file 600 includes configuration selections for the application layer 410, the system layer 412, and the kernel layer 414 in FIG. 4. For example, the configuration file 600 includes designations for the user to designate the file type of the OS installation image, the version, whether to install the OS or update the existing OS, and a target disk to install the resulting OS. The configuration file 600 includes a configuration header 610 that includes the version, target and configuration options as well as the image file format that refers to the format of OS installation image file. The configuration file 600 includes a kernel layer section 620. The kernel layer section 620 allows a user to support: 1) certain versions of a Linux kernel binary, an initial ramdisk binary, and kernel modules; and 2) the version of the firmware. The listed files refer to the path to collect files either in local or cloud storage. The meta refers to the file metadata. The configuration file 600 includes a system layer section 630 that allows the provision of a password, and lists packages to install rpm packages as well as any additional files. The listed files refer to the path to collect files either in local or cloud storage. The path refers to the placement of the bundle builder in the OS. The RPM packages list the RPM packages such as vim and tar that administrators intend to install on the system layer. The configuration file 600 includes an application layer section 640 that allows different application files in any applicable format to be added. The listed files refer to the path to collect files either in local or cloud storage. The path refers to the placement of the bundle builder in the OS.

The example bundle builder highly accelerates the process of deploying OS installation images to a batch of servers and avoids the occurrence of human errors during such deployments. Furthermore, the OS-decoupled architecture of the three layers of the OS installation images enables administrators to customize and duplicate developing environments for different sets of servers. The ability to change specific packages for each layer boosts the flexibility of feature customization on any of the three layers and allows for building user-specific standardization for batch deployment to groups of servers. While the above examples relate to servers, the above described bundle builder may be used to deploy OS installation images to any computer device that is networked with the deployment server. Such computer devices may include laptop computers, desktop computers, and the like.

Figure 7:
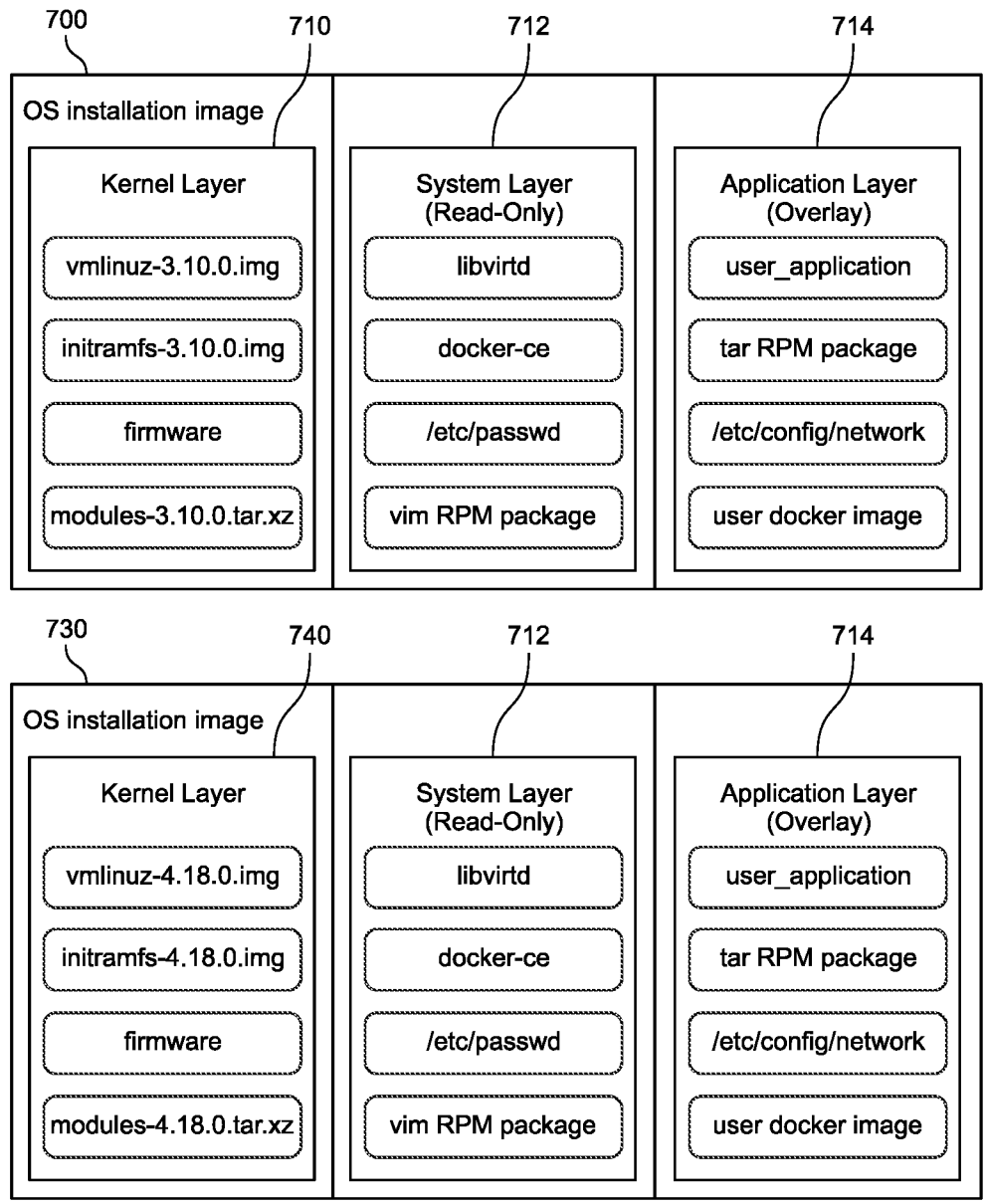
FIG. 7 is a table showing different files for the three layers assembled by the example bundle builder for different image files.

FIG. 7 shows a first table 700 that lists the files for each of the three layer packages that may be assembled by the bundle builder 120 for an initial OS installation image such as the first OS installation image file 160 in FIG. 1A. FIG. 7 shows a second table 730 that lists the files for each of the three layer packages that may be assembled by the bundle builder 120 for a second subsequent OS installation image file such as the second OS installation file 162 in FIG. 1A. The first table 700 shows the contents of a kernel layer package 710, a system layer package 712, and an application layer package 714. In this example, the second table 730 includes the same system layer package 712 and application layer package 714 as the first table 700. Since the contents of the system layer package 712 and the environmental layer package 714 are the same for the OS installation files 160 and 162, the respective files are identical. However, a different set of files representing a different kernel layer package 740 is provided in the second OS installation image file 162 represented by the table 730. Thus, the second OS installation image file is provided to the target server by the bundle builder 120 and the OS installation image is booted so that only the new kernel layer package 730 replaces the kernel layer on target server.

Figure 8:
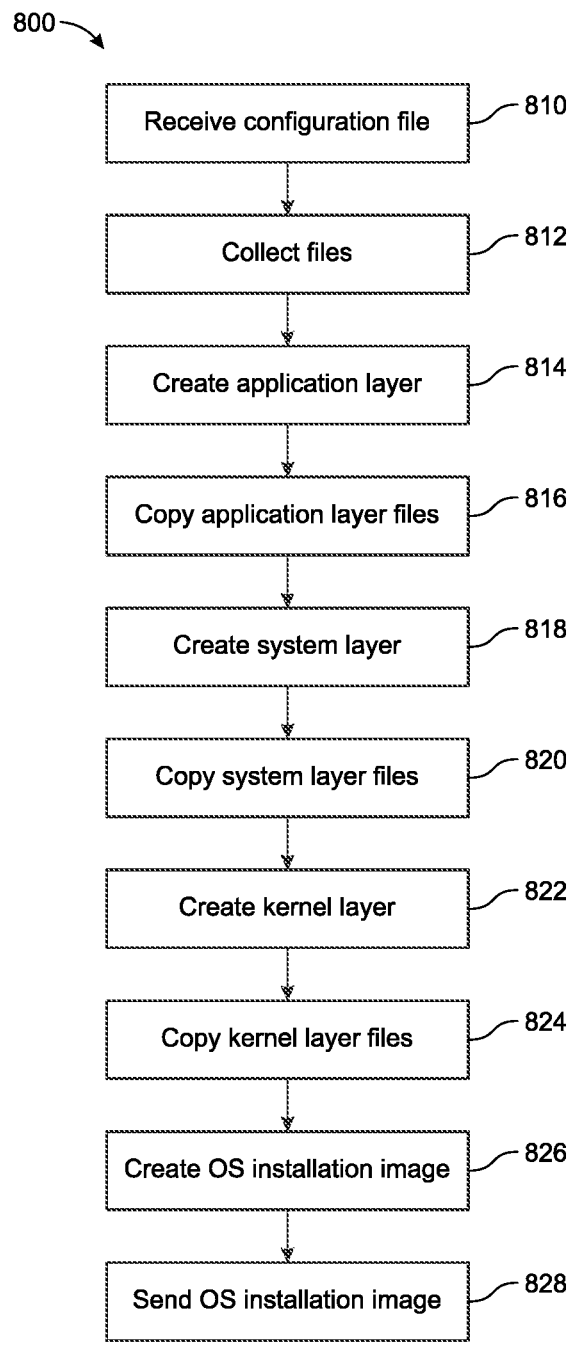
FIG. 8 is a flow diagram of a routine to generate an OS installation image adopted to install a OS and customize the three layers on the OS.

FIG. 8 shows a flow diagram of an implementation routine 800 executed by the example bundle builder 120 in FIG. 1A. The flow diagram in FIG. 8 is representative of example machine readable instructions for the process of configuring an image for deployment to a target server or servers. In this example, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowchart illustrated in FIG. 8, persons of ordinary skill in the art will readily appreciate that many other methods of implementing the example machine readable instructions may alternatively be used. For example, the order of execution of the blocks may be changed, and/or some of the blocks described may be changed, eliminated, or combined.

The bundle builder routine 800 first reads a configuration file received from a management station (810). The contents of the configuration file for each of the three layers are passed to the file collector module 212. The file collector module 212 collects the relevant files according to the configuration file (812). The layer generator 214 then creates the application layer (814). The layer generator 214 then copies the relevant collected files to the application layer (816). The layer generator 214 then creates the system layer (818). The layer generator then sets up the system layer, installs relevant packages, and copies the relevant collected files for the system layer (820). The layer generator 214 then sets up the kernel layer (822). The layer generator copies necessary OS components for the kernel layer (824). Each of the packages are then sent to the image builder. The image builder 216 takes the package layer and creates an OS installation image (826). The image builder 216 then sends the OS installation image to the targeted servers (828).

Figure 9:
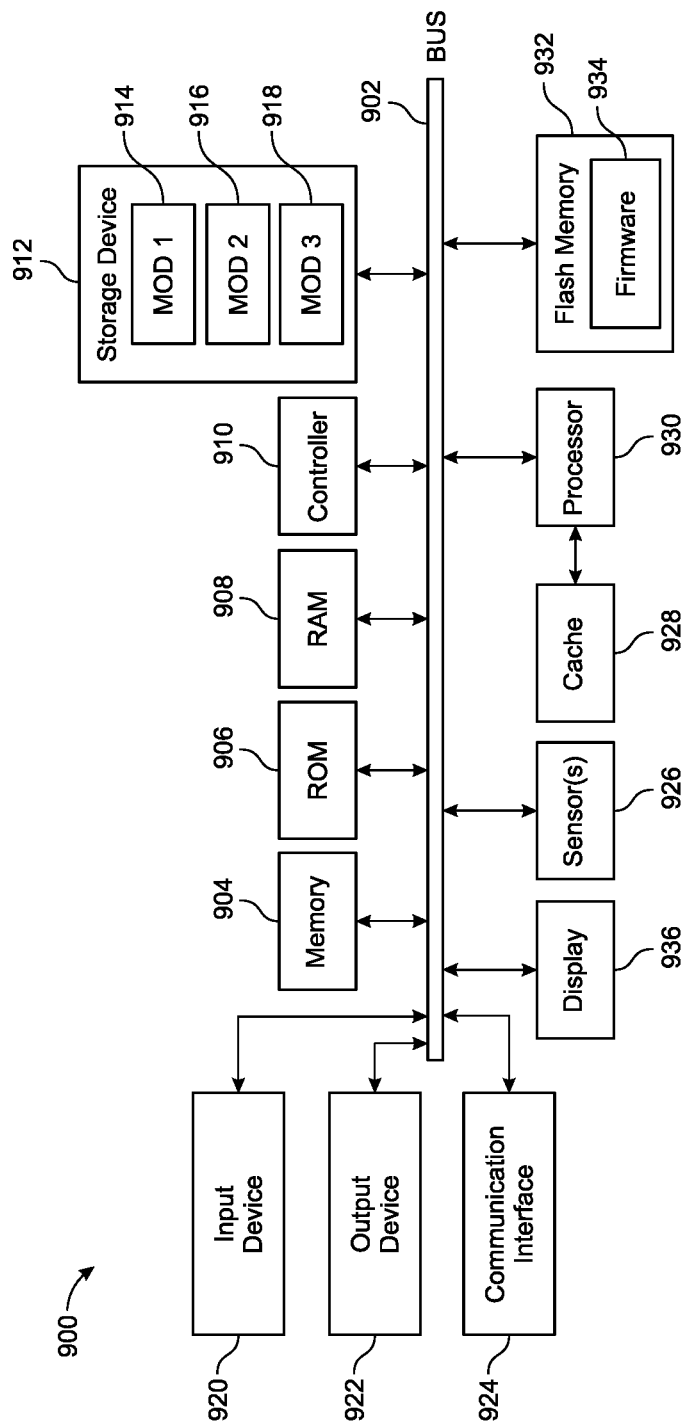
FIGS. 9-10 are block diagrams of computer systems to implement the processes described herein.

FIG. 9 illustrates an example computing system 900, in which the components of the computing system are in electrical communication with each other using a bus 902. The system 900 includes a processing unit (CPU or processor) 930; and a system bus 902 that couples various system components, including the system memory 904 (e.g., read only memory (ROM) 906 and random access memory (RAM) 908), to the processor 930. The system 900 can include a cache of high-speed memory connected directly with, in close proximity to, or integrated as part of the processor 930. The system 900 can copy data from the memory 904 and/or the storage device 912 to the cache 928 for quick access by the processor 930. In this way, the cache can provide a performance boost for processor 930 while waiting for data. These and other modules can control or be configured to control the processor 930 to perform various actions. Other system memory 904 may be available for use as well. The memory 904 can include multiple different types of memory with different performance characteristics. The processor 930 can include any general purpose processor and a hardware module or software module, such as module 1 914, module 2 916, and module 3 918 embedded in storage device 912. The hardware module or software module is configured to control the processor 930, as well as a special-purpose processor where software instructions are incorporated into the actual processor design. The processor 930 may essentially be a completely self-contained computing system that contains multiple cores or processors, a bus, memory controller, cache, etc. A multi-core processor may be symmetric or asymmetric.

To enable user interaction with the computing system 900, an input device 920 is provided as an input mechanism. The input device 920 can comprise a microphone for speech, a touch-sensitive screen for gesture or graphical input, keyboard, mouse, motion input, and so forth. In some instances, multimodal systems can enable a user to provide multiple types of input to communicate with the system 900. In this example, an output device 922 is also provided. The communications interface 924 can govern and manage the user input and system output.

Storage device 912 can be a non-volatile memory to store data that is accessible by a computer. The storage device 912 can be magnetic cassettes, flash memory cards, solid state memory devices, digital versatile disks, cartridges, random access memories (RAMs) 908, read only memory (ROM) 906, and hybrids thereof.

The controller 910 can be a specialized microcontroller or processor on the system 900, such as a BMC (baseboard management controller). In some cases, the controller 910 can be part of an Intelligent Platform Management Interface (IPMI). Moreover, in some cases, the controller 910 can be embedded on a motherboard or main circuit board of the system 900. The controller 910 can manage the interface between system management software and platform hardware. The controller 910 can also communicate with various system devices and components (internal and/or external), such as controllers or peripheral components, as further described below.

The controller 910 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 910 to initiate or conduct specific hardware recovery procedures or operations, as further described below.

The controller 910 can also include a system event log controller and/or storage for managing and maintaining events, alerts, and notifications received by the controller 910. For example, the controller 910 or a system event log controller can receive alerts or notifications from one or more devices and components, and maintain the alerts or notifications in a system event log storage component.

Flash memory 932 can be an electronic non-volatile computer storage medium or chip that can be used by the system 900 for storage and/or data transfer. The flash memory 932 can be electrically erased and/or reprogrammed. Flash memory 932 can include EPROM (erasable programmable read-only memory), EEPROM (electrically erasable programmable read-only memory), ROM, NVRAM, or CMOS (complementary metal-oxide semiconductor), for example. The flash memory 932 can store the firmware 934 executed by the system 900 when the system 900 is first powered on, along with a set of configurations specified for the firmware 934. The flash memory 932 can also store configurations used by the firmware 934.

System 900 can include one or more sensors 926. The one or more sensors 926 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 926 can communicate with the processor, cache 928, flash memory 932, communications interface 924, memory 904, ROM 906, RAM 908, controller 910, and storage device 912, via the bus 902, for example. The one or more sensors 926 can also communicate with other components in the system via one or more different means, such as inter-integrated circuit (I2C), general purpose output (GPO), and the like. Different types of sensors (e.g., sensors 926) on the system 900 can also report to the controller 910 on parameters, such as cooling fan speeds, power status, operating system (OS) status, hardware status, and so forth. A display 936 may be used by the system 900 to provide graphics related to the applications that are executed by the controller 910.

Figure 10:
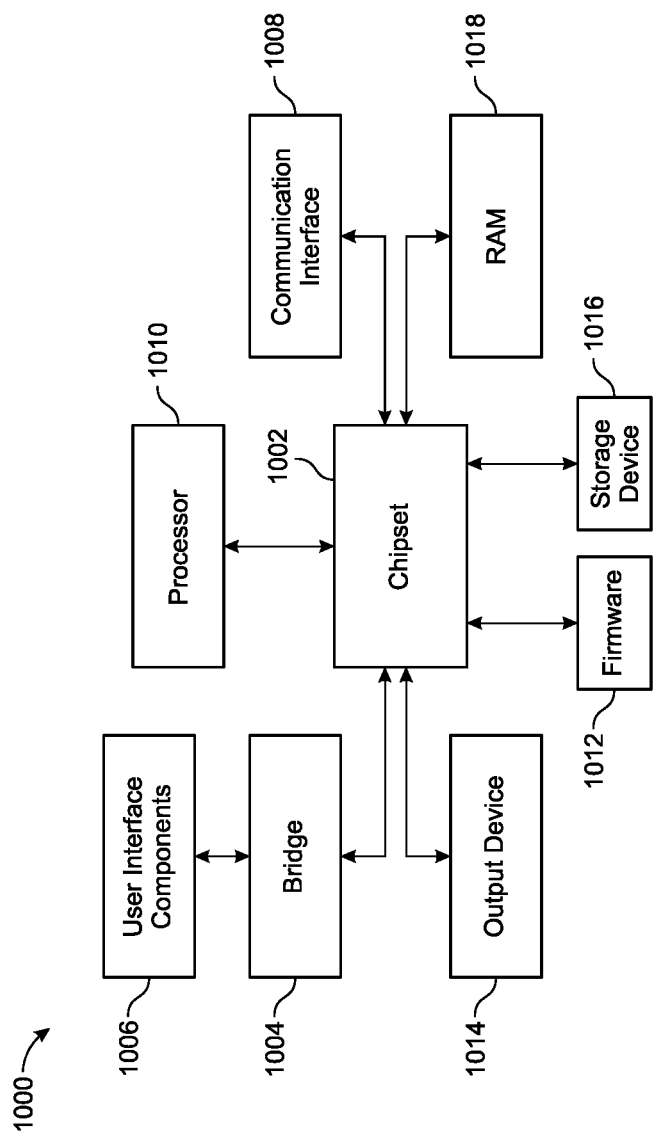

FIG. 10 illustrates an example computer system 1000 having a chipset architecture that can be used in executing the described method(s) or operations, and generating and displaying a graphical user interface (GUI). Computer system 1000 can include computer hardware, software, and firmware that can be used to implement the disclosed technology. System 1000 can include a processor 1010, representative of a variety of physically and/or logically distinct resources capable of executing software, firmware, and hardware configured to perform identified computations. Processor 1010 can communicate with a chipset 1002 that can control input to and output from processor 1010. In this example, chipset 1002 outputs information to output device 1014, such as a display, and can read and write information to storage device 1016. The storage device 1016 can include magnetic media, and solid state media, for example. Chipset 1002 can also read data from and write data to RAM 1018. A bridge 1004 for interfacing with a variety of user interface components 1006, can be provided for interfacing with chipset 1002. User interface components 1006 can include a keyboard, a microphone, touch detection and processing circuitry, and a pointing device, such as a mouse.

Chipset 1002 can also interface with one or more communication interfaces 1008 that can have different physical interfaces. Such communication interfaces can include interfaces for wired and wireless local area networks, for broadband wireless networks, and for personal area networks. Further, the machine can receive inputs from a user via user interface components 1006, and execute appropriate functions, such as browsing functions by interpreting these inputs using processor 1010.

Moreover, chipset 1002 can also communicate with firmware 1012, which can be executed by the computer system 1000 when powering on. The firmware 1012 can recognize, initialize, and test hardware present in the computer system 1000 based on a set of firmware configurations. The firmware 1012 can perform a self-test, such as a POST, on the system 1000. The self-test can test the functionality of the various hardware components 1002-1018. The firmware 1012 can address and allocate an area in the memory 1018 to store an OS. The firmware 1012 can load a boot loader and/or OS, and give control of the system 1000 to the OS. In some cases, the firmware 1012 can communicate with the hardware components 1002-1010 and 1014-1018. Here, the firmware 1012 can communicate with the hardware components 1002-1010 and 1014-1018 through the chipset 1002, and/or through one or more other components. In some cases, the firmware 1012 can communicate directly with the hardware components 1002-1010 and 1014-1018.

It can be appreciated that example systems 900 (in FIG. 9) and 1000 can have more than one processor (e.g., 930, 1010), or be part of a group or cluster of computing devices networked together to provide greater processing capability.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A computer system comprising:
    a target computer device;
    a network coupled to the target computer device; and
    a deployment server coupled to the network, the deployment server executing a bundle builder to install operation system (OS) installation images to the target computer device to set up an operating system, an operating environment, and a plurality of applications on the target computer, the bundle builder operable to:
    read a first configuration file;
    collect electronic files for corresponding packages for a system layer, a kernel layer, and an application layer based on the first configuration file;
    consolidate the corresponding layer packages into an OS installation image file, the deployment server deploying the OS installation image file to the target computer device over the network and installing an operating system, an operating environment, and a plurality of applications on the target computer from the collected electronic files of the deployed OS installation image file.

2. The system of claim 1, wherein the target computer device is a first target server and the system further comprises a second target server coupled to the network.

3. The system of claim 2, wherein the deployment server installs the OS installation image file on the second target server.

4. The system of claim 2, wherein the deployment server is further operable to:
    receive a second configuration file;
    combine packages of a second OS installation image file based on the second configuration file, the second OS installation image file having a different package for at least one of the system layer, the kernel layer, and the application layer from the layer packages of the OS installation image file; and
    send the second OS installation image file to the second target server.

5. The system of claim 1, wherein the application layer package includes user application files.

6. The system of claim 1, wherein the system layer package is built from built from a root file system and includes environment configurations.

7. The system of claim 1, wherein the kernel layer package includes operating system components.

8. The system of claim 1, wherein the electronic files are collected from one of local storage, a file server, or a cloud server.

9. The system of claim 1, wherein a new configuration file is read that provides at least one new kernel layer package, one new system layer package, or one new application layer package.

10. The system of claim 1, wherein the OS installation image file is in a predetermined format.

11. A method of providing operating system installation images in a computer system including a deployment server and a target computer device, the method comprising:
receiving a configuration file for a system layer, a kernel layer, and an application layer;
collecting electronic files according to the configuration file;
assembling packages of the electronic files for the system layer, the kernel layer, and the application layer in a combined operating system (OS) installation image file; and
sending the combined OS installation image file to the target computer device over a network to set up an operating system, an operating environment, and a plurality of applications on the target computer; and
installing an operating system, an operating environment, and a plurality of applications on the target computer device from the collected electronic files of the OS installation image file.

12. The method of claim 11, wherein the target computer device is a first target server, wherein the system includes a second target server, and wherein the OS installation image file is sent to the second target server.

13. The method of claim 11, wherein the target computer device is a first target server, wherein the system includes a second target server, and wherein a second combined OS installation image file based on a second configuration file, having a different package for at least one of the system layer, the kernel layer, and the application layer, is sent to the second target server.

14. The method of claim 11, wherein the application layer package includes user application files.

15. The method of claim 11, wherein the system layer package is built from a root file system and includes environment configurations.

16. The method of claim 11, wherein the kernel layer package includes operating system components.

17. The method of claim 11, wherein the electronic files are collected from one of a local storage, a file server, or a cloud server.

18. The method of claim 11, wherein a new configuration file is read that provides at least one new kernel layer package, one new system layer package, or one new application layer package.

19. The method of claim 18, wherein the at least one new package is sent to at least one target server and booted to replace the corresponding kernel layer package, system layer package or application layer package.

20. The method of claim 11, wherein the OS installation image file is generated in a predetermined format.

* * * * *